United States Patent
Motoyama

(10) Patent No.: US 7,555,556 B2
(45) Date of Patent: Jun. 30, 2009

(54) SYSTEM, COMPUTER PROGRAM PRODUCT AND METHOD FOR USING A WIRELESS DEVICE TO CONTROL A WIRELESS NETWORK DEVICE

(75) Inventor: Tetsuro Motoyama, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 445 days.

(21) Appl. No.: 11/350,033

(22) Filed: Feb. 9, 2006

(65) Prior Publication Data

US 2007/0198671 A1 Aug. 23, 2007

(51) Int. Cl.
*G06F 15/16* (2006.01)
(52) U.S. Cl. .................. 709/227; 709/238; 455/41.2
(58) Field of Classification Search ......... 709/200–203, 709/217–227, 238; 455/41.2
See application file for complete search history.

(56) References Cited

U.S. PATENT DOCUMENTS

| | | | | |
|---|---|---|---|---|
| 6,919,790 | B2 * | 7/2005 | Kanazawa | 340/5.21 |
| 7,085,382 | B2 * | 8/2006 | Terao et al. | 380/247 |
| 7,251,489 | B2 * | 7/2007 | Beasley et al. | 455/436 |
| 7,336,929 | B2 * | 2/2008 | Yasuda et al. | 455/41.2 |
| 2002/0147819 | A1 * | 10/2002 | Miyakoshi et al. | 709/228 |
| 2002/0154025 | A1 | 10/2002 | Ling | |
| 2003/0203742 | A1 | 10/2003 | D'Souza et al. | |
| 2003/0210126 | A1 * | 11/2003 | Kanazawa | 340/5.5 |
| 2004/0015575 | A1 | 1/2004 | Motoyama | |
| 2004/0258032 | A1 * | 12/2004 | Kawamura | 370/338 |
| 2005/0076242 | A1 * | 4/2005 | Breuer | 713/201 |
| 2005/0094610 | A1 | 5/2005 | de Clerq et al. | |
| 2006/0031457 | A1 | 2/2006 | Motoyama | |
| 2007/0079008 | A1 * | 4/2007 | Leibovich et al. | 709/246 |

FOREIGN PATENT DOCUMENTS

EP 1 414 264 A1 4/2004
EP 1 432 180 A1 6/2004

OTHER PUBLICATIONS

U.S. Appl. No. 11/350,033, filed Feb. 9, 2006, Motoyama.
U.S. Appl. No. 11/384,507, filed Mar. 21, 2006, Motoyama.
U.S. Appl. No. 11/455,663, filed Jun. 20, 2006, Motoyama.
U.S. Appl. No. 12/314,269, filed Dec. 5, 2008, Motoyama.

* cited by examiner

*Primary Examiner*—Moustafa M Meky
(74) *Attorney, Agent, or Firm*—Oblon, Spivak, McClelland, Maier & Neustadt, P.C.

(57) ABSTRACT

Method, system and computer readable medium for use in a first wireless device for controlling a second wireless device. The method includes obtaining an address of the second wireless device via a limited access connection, obtaining identification information of the second wireless device from the second wireless device, and determining whether to register or not to register the second wireless device for control by the first wireless device based on the identification information. Also included in the method is saving the address of the second wireless device into a memory of the first wireless device when the first wireless device determines to register the second wireless device for control by the first wireless device.

24 Claims, 14 Drawing Sheets

410

1. Setup New Device for Network and Register
2. Search Unregistered Device for Registration
3. Display Device Menu

Figure 6

SYSTEM, COMPUTER PROGRAM PRODUCT AND METHOD FOR USING A WIRELESS DEVICE TO CONTROL A WIRELESS NETWORK DEVICE

CROSS-REFERENCE TO RELATED APPLICATON

This application relates to U.S. patent application Ser. Nos. 09/921,707 and 10/198,991. The subject matter of these applications is incorporated herein by reference.

BACKGROUND OF THE INVENTION

1. Field of the Invention

The present invention is directed to methods, computer-based systems and computer program products for controlling devices, and in particular using a wireless controller to control electronic devices connected to a wireless network.

2. Discussion of the Background

The past few decades have witnessed the ever-increasing pervasiveness of electronic and computer equipment in our work and home lives. From home entertainment systems to office equipment, the modern home and workplace includes a vast array of electronic devices. Moreover, traditional electrical devices such as refrigerators and ordinary lighting units have become sophisticated microprocessor controlled devices. As Internet Protocol Version 6 (IPV6) having more address space begins to be implemented, it is likely that more devices, such as those described above, will be assigned an IP addresses. In addition, the rapid development of wireless technology is has reduced the price of wireless chips. Therefore, it is expected that in the in the near future, more devices will have the capability of the wireless communication and access to networks such as the Internet.

The diversity of the above devices makes it difficult for users to manually control the settings of these devices. For example, while most microprocessor based devices are set up and manually controlled by way of a menu driven interface, the menu organization and terminology varies greatly among electronic devices. Indeed, one must spend a great deal of time reading setup and control instructions for each device in the home or workplace in order to optimize the features and conveniences of these device. This is both a burden and a bother to users.

In addition to the burden of learning the control features of each electronic device, many devices are not provided with a remote controller thereby requiring the user to input commands to each device locally. Those devices that do have remote control such as televisions, VCRs, DVD, room heater/air condition unit and ceiling fans have traditionally used an infrared transceiver on the remote control device and the device to be controlled. However, such control devices require line of sight infrared communications which is not suitable for controlling wireless network devices that are scattered throughout various rooms of a household or office. Moreover, traditional remote control devices are often complex devices that include a large number of buttons associated with functional controls for the device to be controlled.

SUMMARY OF THE INVENTION

An object of the present invention is to provide a method, system, and computer readable medium for providing a uniform control menu for a variety of electronic devices.

Another object of the present invention is to provide a method, system, and computer readable medium for joining an electronic device to a wireless network without using a server of the network. These and other objects of the present invention are achieved by a method for use in a first wireless device for controlling a second wireless device. The method includes obtaining or setting an address of the second wireless device via a limited access connection, obtaining identification information of the second wireless device from the second wireless device, and determining whether to register or not to register the second wireless device for control by the first wireless device based on the identification information. Also included in the method is saving the address of the second wireless device into a memory of the first wireless device when the first wireless device determines to register the second wireless device for control by the first wireless device.

Another aspect of the invention includes a wireless control device having a memory device having embodied therein, data related to controlling a target wireless device. A processor is in communication with the memory device, and is configured to obtain an address of the target wireless device via a limited access connection and obtain identification information of the target wireless device from the target wireless device. The processor also determines whether to register or not to register the target wireless device for control by the wireless control device based on the identification information, and saves the address of the target wireless device into the memory when the wireless control device determines to register the wireless target device for control by the wireless control device.

Still another aspect of the invention includes a wireless control device having means for storing data related to controlling a target wireless device, means for obtaining an address of the target wireless device via a limited access connection and means for obtaining identification information of the target wireless device from the target wireless device. Also included is means for determining whether to register or not to register the target wireless device for control by the wireless control device based on the identification information, and means for saving the address of the target wireless device into the memory when the wireless control device determines to register the wireless target device for control by the wireless control device.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 6 shows an exemplary menu that may be displayed on the display 410 of the control device in accordance with an embodiment of the invention;

DESCRIPTION OF THE PREFERRED EMBODIMENTS

Figure 1:
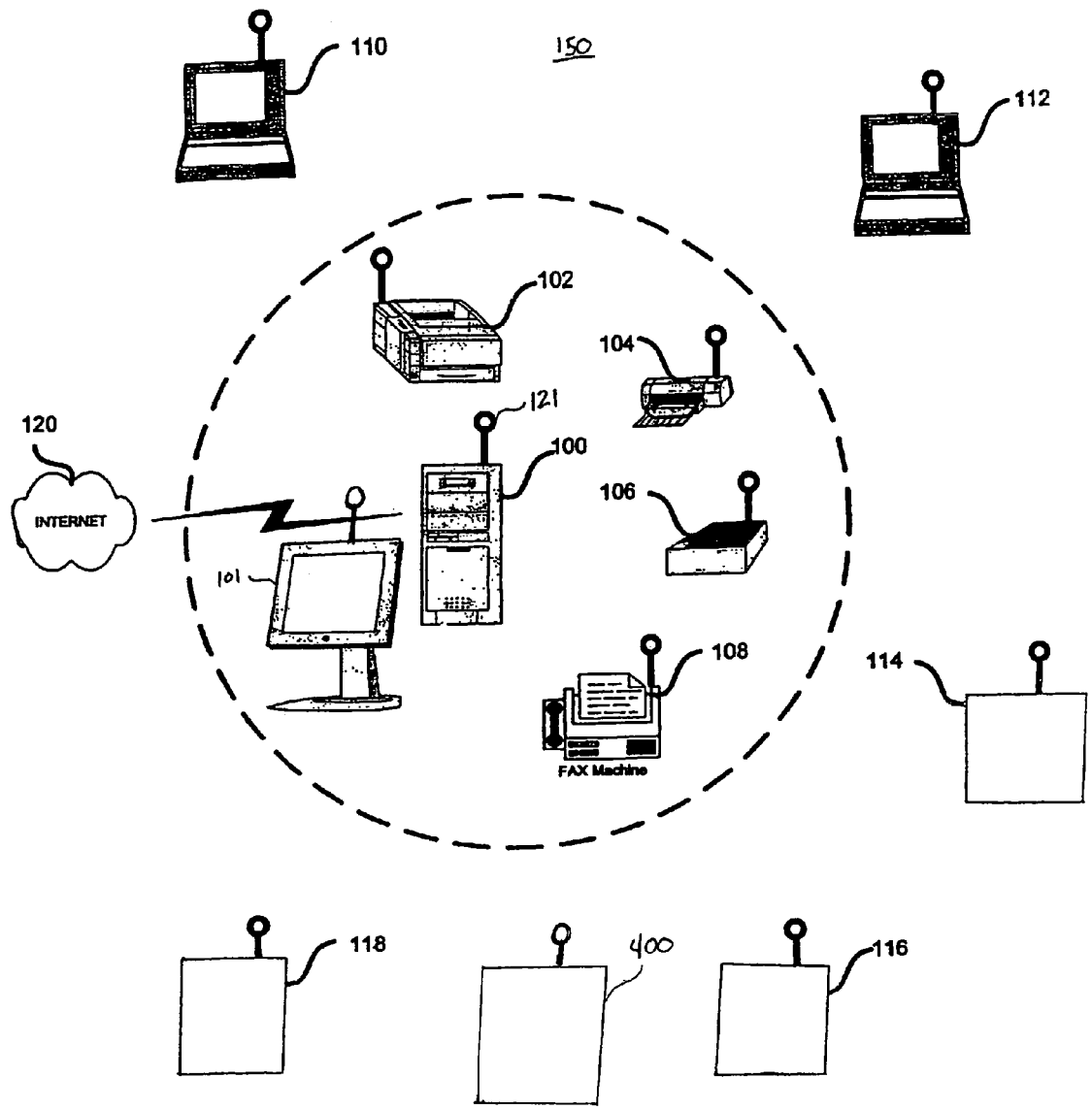
FIG. 1 is a system diagram illustrating a system and device for controlling electronic devices on a wireless network in accordance with an embodiment of the invention.

Referring now to the drawings, wherein like reference numerals designate identical or corresponding parts throughout the several views, FIG. 1 is a system diagram illustrating a system and device for controlling electronic devices on a wireless network in accordance with an embodiment of the invention. The system includes a main server 100 with an access point, a display 101, and office equipment including printers 102 and 104, scanner 106, and fax machine 108. The system also includes mobile terminals 110 and 112, entertainment device 114, appliance 116, and environmental control devices 118, as well as a controller 400. As seen in FIG. 1, each of the devices 100-118 and 400 include an antenna represented by the symbol numbered as 121 on the main server 100. In addition, one or all of the devices in FIG. 1 may be provided with access to the Internet 120 either independently or through the main server 100.

The main server 100 is any suitable workstation, desktop computer or other suitable network node for providing the management of computer and networking resources from a single point of administration. The main server includes a wireless transceiver device that allows the main server 100 to transfer display information to display 101 and to transfer files and other data to the other wireless electronic equipment 102-118 or 400 by way of antenna 121. Thus, the main server 100 provides a server function in a wireless local area network (LAN) including the electronic equipment 102-118 of FIG. 1 as clients. The LAN may be a bus, hub, or any other network type and may contain a firewall (not shown). A firewall is a hardware device or software that allows only authorized computers on one side of the firewall to connect to a network or computer on the other side of the firewall. Firewalls are known and commercially available devices or software (e.g., PIX Firewalls from Cisco, ZoneAlarm from Zone Labs).

Figure 14:
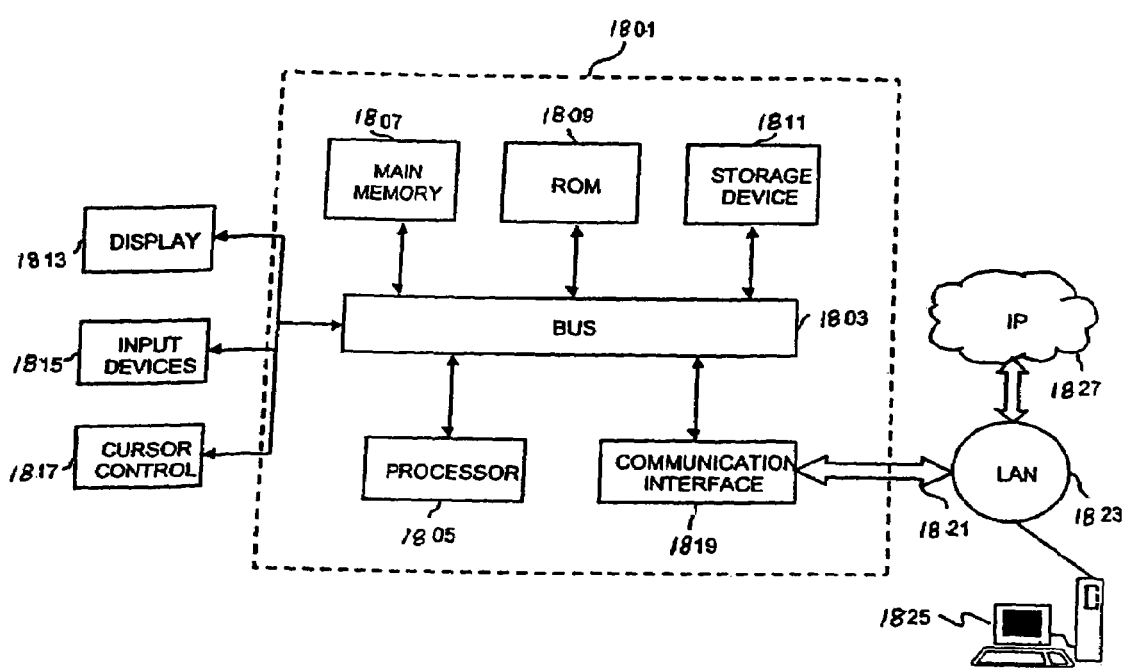
FIG. 14 illustrates a general purpose computer system upon which an embodiment according to the present invention may be implemented.

The main server 100 may be implemented using a general purpose computer, such as the computer of FIG. 14, that includes network operating system (NOS) software such as windows NT, Unix, Linux, or Novell Netware. The main server 100 may include a login server application such as Novell Directory Services ("NDS"), which is a product for managing access to computer networks. Using NDS, a network administrator can set up and control a database of users and manage them using a directory with a graphical user interface. Using NDS, or the main server 100, users of computers and other devices at remote locations can be added, updated, and managed centrally. The login operation to the network is typically controlled by a script, which is executed or interpreted. As an alternative to Novell Directory Services, Microsoft's Active Directory may be utilized as a directory service. Moreover, any suitable software and/or hardware may be utilized to assist in controlling access to and management of the network resources.

The main server 100 may also include file server, e-mail server, and Internet server applications if desired. The file server application allows files contained on the main server 100 to be accessed by devices 102-118 or 400. The email server may be utilized to manage and control email accounts on the network and permit the sending and receiving of Internet email via Internet 120. The Internet server allows access to the Internet 120. If desired, the Internet server may be utilized to allow browsing of the World Wide Web, can allow file transfers using the File Transfer Protocol, and may allow the transmission and receipt of Internet electronic mail messages from suitable network nodes such as the mobile terminals 110 and 112.

In addition to the server applications described above, the main server 100 can include management and control applications for managing and controlling each of the devices connected to the main server 100, and in particular the entertainment device 114, the appliance 116, and the environmental device 118. For example, the main server 100 may include software for automatically controlling a thermostat or for providing a uniform means of manually controlling each of the electronic devices on the wireless LAN 150 as will be further described below. Examples of management and control of electronics devices on a wireless network are disclosed in U.S. patent application Ser. Nos. 09/921,707 and 10/198,991, the entire content of which are incorporated herein by reference.

The office equipment of the LAN 150 is signified by the dashed circle in FIG. 1 and provides all of the functions of conventional equipment that may be associated with a home or workplace office. For example, printers 102 and 104 may be implemented as an impact or non-impact printing device for printing text and images on a printing medium. Similarly, scanner 106 and fax machine 108 may provide conventional optical scanning and facsimile transmission functions respectfully. Despite these conventional functions, the printers 102 and 104, the scanner 106, and the fax machine 108 of the present invention are provided with a wireless transceiver suitable for communicating with the main server 100 via their respective antennas. In this regard, special server applications such as a print server may be provided on the main server 100 to allow all terminals on the network to share the printers 102 and 104, and office equipment in general.

Mobile terminals 110 and 112 function as mobile computer terminals having a transceiver that allows wireless access to the main server 100. The terminals may be dumb terminals having only the minimum hardware needed to access the main server 100, or may be thin or fat clients having the local hardware devices needed for independent operation, depending on the user needs. If connected to the network 150, each mobile terminal 110 and 112 can utilize the resources of the main terminal 100. For example, either of the terminals 110 and 112 can use the printer 102, printer 104, scanner 106, or fax machine 108. Similarly, the terminals 110 and 112 can access files and software applications stored on the local storage of the main server 100. Since the terminals have wireless access and share the resources of the main server 100, they can be easily moved to any location that is within the area of coverage of the wireless LAN 150. In a preferred embodiment, this area of coverage can be adjusted to a desired size as described in U.S. patent application Ser. Nos. 09/921,707 and 10/198,991.

Entertainment device 114 may be any one of a variety of electronic devices used for providing entertainment to a user. For example, entertainment device 114 may be a television, stereo, video game, video cassette recorder (VCR), digital video disk (DVD) player, compact disk (CD) player or any other electronic device for entertaining the user. While the functionality of these devices is well known in the art, the entertainment device 114 of the present invention is provided with a transceiver suitable for allowing wireless communication with the main server 100 and/or control device 400 by way of antenna 121. Thus, entertainment device 114 is connected to the wireless LAN 150. In one embodiment of the present invention, the main server 100 contains software for managing and controlling the entertainment device as will be described below.

Appliance 116 represents an electronic device for performing some work for the user of the appliance. The appliance 116 may be a dishwasher, coffee maker, refrigerator, a clothes washer or dryer, or any other similar device. The appliance 116 is also equipped with a transceiver for providing wireless communication with the main server 100 and/or control device 400 via antenna 121 and is therefore connected to LAN 150. As with the entertainment device 114, the appliance 116 may be managed and controlled by the main server 100.

Environmental control device 118 represents those electronic devices found in the home or workplace, which control the environment of such areas. For example, environmental control device 118 may be a thermostat for controlling the heat and air conditioning of a home or building, a lighting unit, a ceiling fan, an attic fan or other exhaust unit, a humidity control unit, or similar device. As with the other devices in FIG. 1, the environmental control unit 118 is provided with a transceiver for allowing wireless communication via antenna 121 and therefore can be connected to wireless LAN 150.

As noted above, the coverage area of the wireless LAN 150 may be set to a predetermined range. Specifically, in a preferred embodiment, the transceiver of the main server 100 includes an adjustable signal strength feature. By adjusting the output power of the main server 100, a user controls the range at which the network nodes (i.e. the electronic devices) can be placed and still be able to communicate with the main server 100 to maintain a network connection and share the resources of the main server 100. In this regard, the transceivers of electronic devices 102-118 and 400 may also include an adjustable transmit power feature. In a preferred embodiment, the electronic devices 102-118 and 400 have an automatic adjustment feature that adjusts the transmit power based on a detected signal strength of signals transmitted from the main server 100. Any known method or device for detecting signal strength may be used to implement this feature of the present invention.

The control device 400 is a portable control device that can be used to add an electronic device on the network 150, control the electronic devices of the network, or provide other functions described below. In one embodiment, the control device 400 provides a uniform interface for manual control of the electronic devices on the wireless LAN. In another embodiment, the control device 400 allows an electronic device to be added to the network 150 without initially accessing a server of the network. Each device on the network 150 preferably includes applications software that allows the control device 400 to interface with the electronic device. As with the other devices on the LAN, the control device 400 includes a transceiver and antenna 121 for communicating wirelessly with the main server 100 and other nodes of the LAN. The control device may be implemented as a designated lightweight handheld device similar to a remote control for a television, for example. In a preferred embodiment, the control device 400 may be implemented as part of a cellular telephone, portable game with wireless capability, a PDA or any other portable computing device having wireless communication capability. The antenna 121 of the control device preferably emits an omnidirectional signal allowing the control device 400 to control electronic devices on the wireless LAN without being in line of sight of the device to be controlled. Such control may be by direct connection, or indirect connection via the server 100 or Internet 120.

Figure 2:
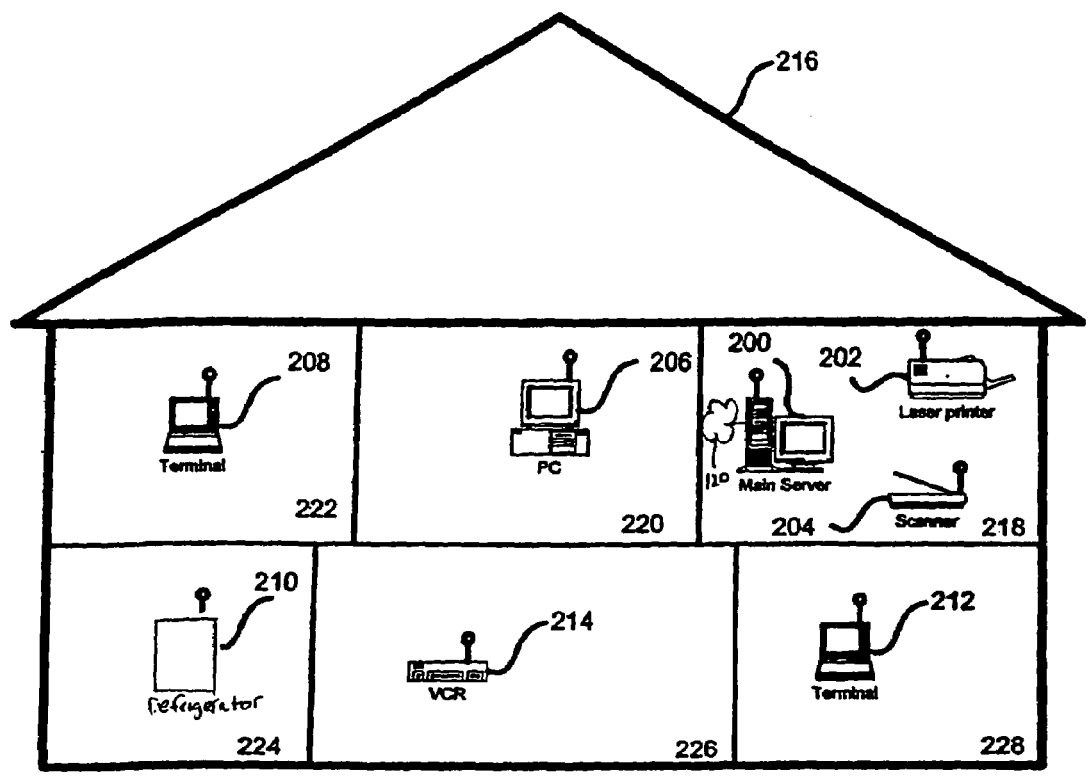
FIG. 2 is an illustration of the wireless LAN of the present invention implemented in a home environment.

As mentioned, the wireless network of FIG. 1 may be applied to a home or workplace environment. FIG. 2 is an illustration of the wireless LAN of the present invention implemented in a home environment. As seen in this figure, home 216 includes rooms 218, 220, 222, 224, 226, and 228 separated by walls or other physical structures. Room 218 of the home 216 contains a main server 200, a laser printer 202, and a scanner 204 and, thus, may serve as a home office. The main server 200 is depicted as a desktop computer with limited portability, but may be implemented as any general purpose computer such as the computer of FIG. 14. Moreover, the main server 200 may be connected to the Internet 120. Room 220 includes a desktop computer 206, while rooms 222 and 228 include mobile terminals 208 and 212 respectively. As with the mobile terminals of FIG. 1, the mobile terminals 208 and 212 may be dumb terminals, which provide the light weight and small size desirable for increased portability, or stand alone computers. Room 224 includes refrigerator 210 and room 226 includes VCR 214.

As with the system of FIG. 1, the devices in FIG. 2 each include an antenna that allows connection of the respective electronic device to a wireless network controlled by server 200, and/or allows each device to communicate wirelessly with the controller 400 or Internet 120. Thus, while the laser printer 202 and the scanner 204 are shown in room 218, these devices may be placed in any other room in the home 216 and still maintain communication with the main server 200, for example. Moreover, the transmit power of the wireless devices of FIG. 2 may be adjustable to control the range of coverage of the network. As each device of FIG. 2 is connected to a wireless LAN, each electronic device of FIG. 2 can communicate each other and share the resources of the main server 200. In addition, the main server 200 can include software for managing and controlling the electronic devices on the home wireless network of FIG. 2.

Figure 3:
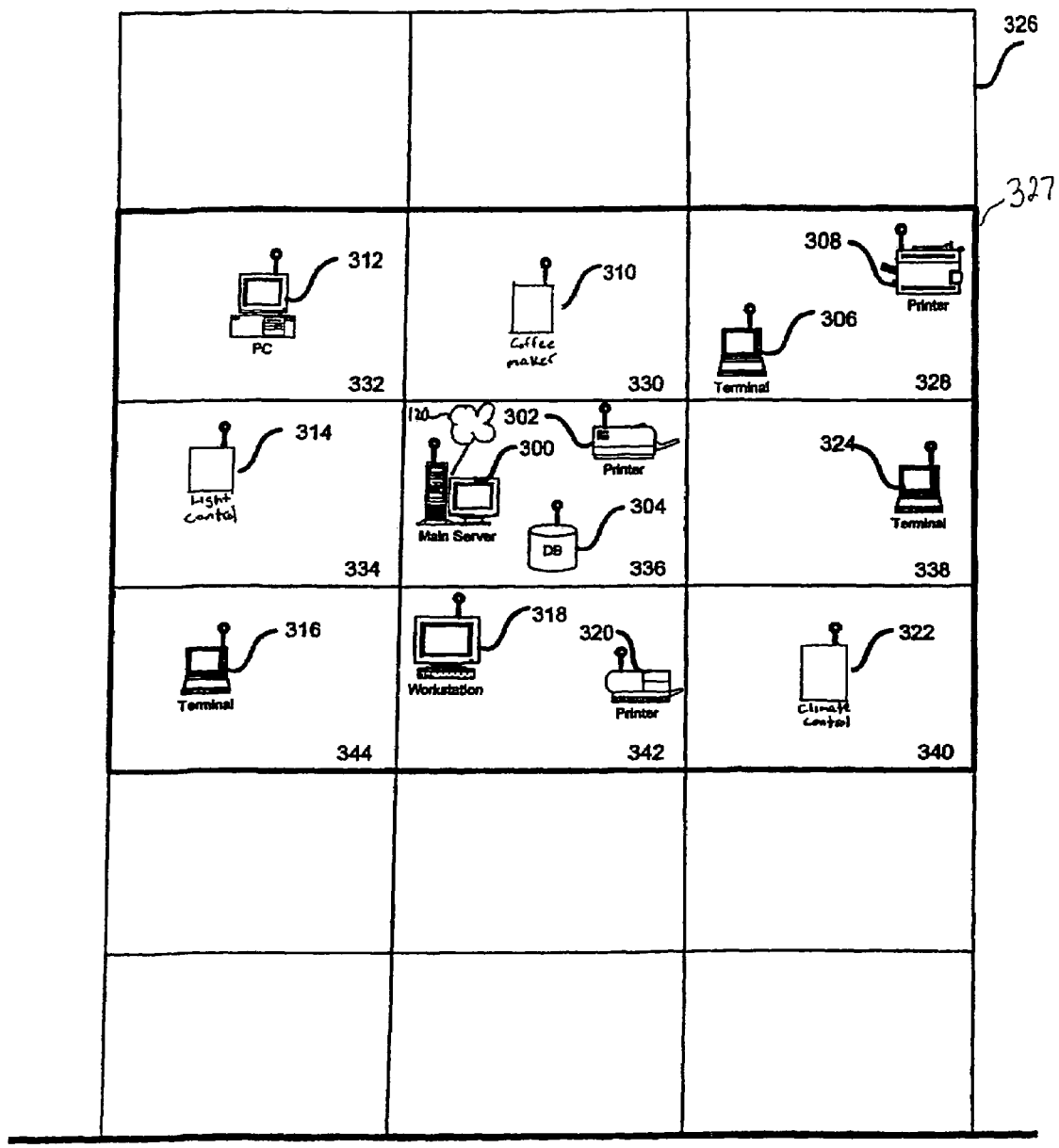
FIG. 3 is an illustration of the wireless LAN of the present invention implemented in a workplace environment.

FIG. 3 is an illustration of the wireless LAN of the present invention implemented in a workplace environment. The workplace 327 is in an office building 326 and includes rooms 328, 330, 332, 334, 336, 338, 340, 342, and 344 separated by a wall or other physical structure. Room 336 contains a main server 300, printer 302, and database 304 with main server 300 connected to Internet 120. The main server 300 and printer 302 are similar to their respective devices described in FIGS. 1 and 2. The database 304 contains records for carrying out the business of the workplace 327. Rooms 328, 338, and 344 include mobile terminals 306, 324, and 316 respectively, with room 328 also containing a printer 308. Room 332 includes a desktop computer 312 and room 342 includes a workstation 318 and printer 320. The workstation 318 is similar to the mobile terminals in that it can depend largely on the hardware of the main terminal 300 for operation, however the workstation 318 may include a relatively large monitor suitable for displaying graphic and other special purpose software applications provided by the main server 300. Alternatively, the workstation 318 may be a powerful machine with disk and processing power interacting with the resources of the main server 300.

In addition to the office equipment described above, the workplace 327 also includes a coffee maker 310 in room 330, a lighting control unit 314 in room 334, and a climate control unit 322 in room 340. The coffee maker 310 is preferably provided with a timing device for brewing coffee at a predetermined time and includes a transceiver for communicating with the main server 300 via antenna 321. The lighting control device 314 is a unit for controlling the lighting of the workplace and also includes a timer for automatically activating the lighting at predetermined times. While the lighting control 314 is shown as a single unit located in room 334, it is to be understood that the lighting control can be implemented as a plurality of wireless units located on individual lights throughout the workplace 327. Finally, the climate control 322 is a wireless device that controls temperature and other environmental factors within the workplace. As with the lighting control, the climate control may be implemented as a plurality of wireless units located on individual environmental units throughout the workplace 327.

As seen in FIG. 3, only a portion of the rooms available in the office building 326 make up the workplace area for the wireless network. In one embodiment, the main server 300 emits an omnidirectional wireless communication signal and is therefore centrally located in the workplace so that the output power of the main server 300 covers an area substantially corresponding to the periphery of the workplace 327. In this regard, the transmit power of the main server 300 is preferably adjustable to cover a larger area of the building 326 should the workplace area be expanded. As previously described, the output power levels of the other (i.e. client) wireless electronic devices of FIG. 3 may also be adjustable.

It is to be understood that the system in FIGS. 1-3 are for exemplary purposes only, as many variations of the specific hardware and software used to implement the present invention will be readily apparent to one having ordinary skill in the art. For example, the functionality of the main server 100 may be divided among several computers. Moreover, while the systems are described as a client server network in which the main server 100 serves as the central server, the system may operate as a peer to peer network or mesh network in which the mobile terminals controller or other devices in the system communicate each other. Finally, it is to be understood that the electronic devices connected to the LANs of FIGS. 1-3 are exemplary only and the present invention contemplates that any electronic devices may be connected to a LAN to realize the benefits and advantages of the present invention.

The wireless network of FIGS. 1-3 may be established and maintained by any known multiple access protocol. Examples of multiple access protocols may be found in the IEEE 802.11 standard, final draft approved Jun. 26, 1997, and the Blue tooth specification "Specification of the Blue Tooth System", V.1.OB, Dec. 1, 1999, core specification—Vol. 1, the entire contents of which are incorporated herein by reference. It is to be understood that the features and benefits of the present invention do not depend on a particular protocol and any of the above named protocols or any other protocol may be used to practice the present invention as will be understood to one of ordinary skill in the art.

Figure 4:
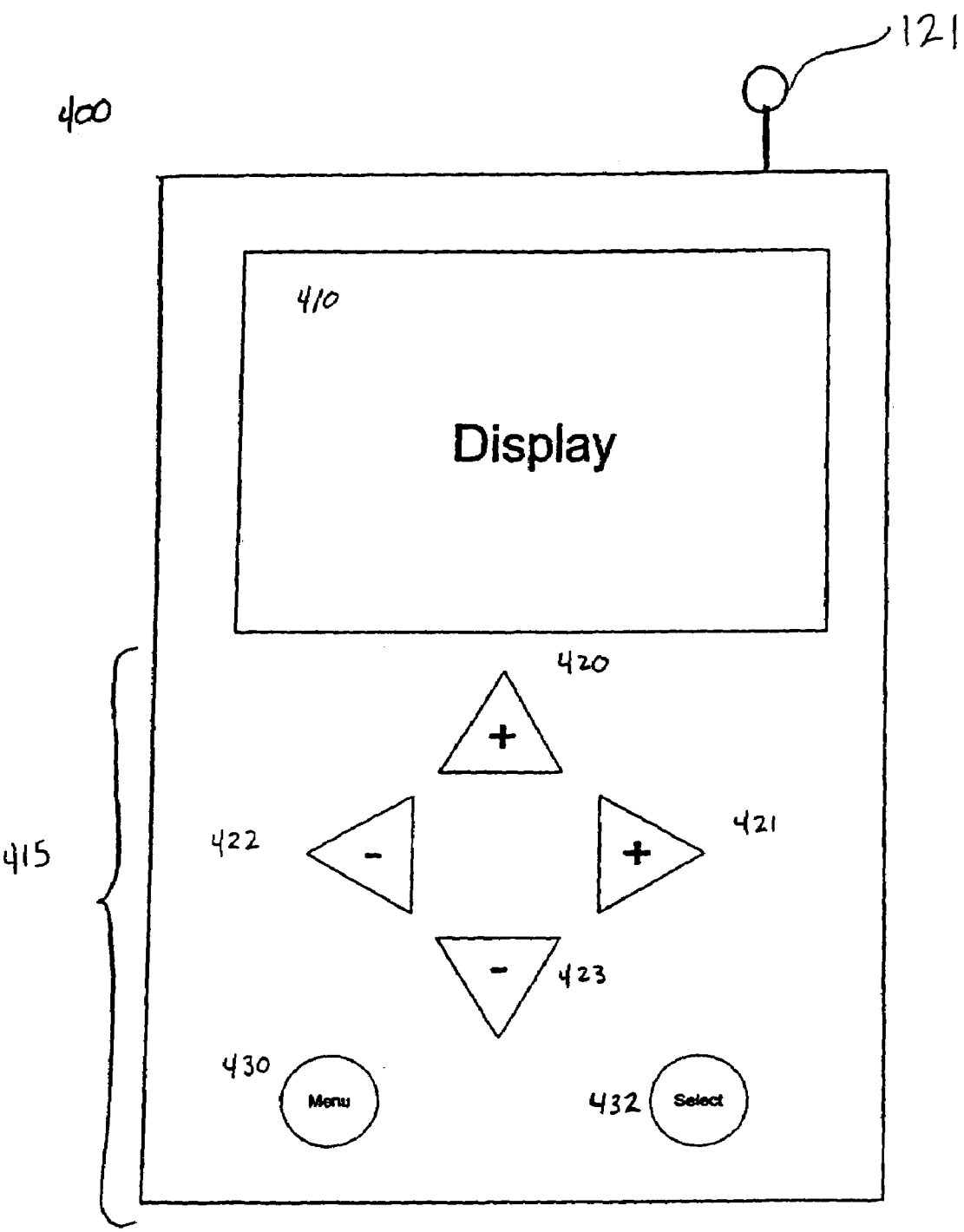
FIG. 4 is an illustration of the control panel of a control device in accordance with one embodiment of the present invention.

FIG. 4 is an illustration of the control panel of the control device 400. As seen in this figure, the control device includes a display 410 and an input keypad 415. The display is preferably a liquid crystal display (LCD) such as that used by the phone or Personal Digital Assistant (PDA), but may be implemented as any one of the known display devices. The keypad 415 includes up directional button 420, right directional button 421, left directional button 422, down directional button 423, and menu and select buttons 430 and 432 respectively. The directional buttons 420 through 423 are used to control a cursor and to navigate through menus displayed on the display 410 as will be described below. Buttons 420 through 423 can be on the one button or separated so long as the directional information can be obtained from the user. The menu button 430 and the select button 432 are used to initiate the display of a menu and to select items in a menu as will be further described below. The select button 432 can function as the click of the mouse button. In a graphical user interface environment, the directional buttons and menu and select buttons may be configured to operate as a mouse. In addition, if needed, two additional buttons may be added to the control device 400, including one corresponding to the function of the right click button of the mouse. Thus, the control device 400 is a simple portable wireless device for displaying, navigating and selecting control menus for the electrical devices connected to the wireless LAN.

Figure 5:
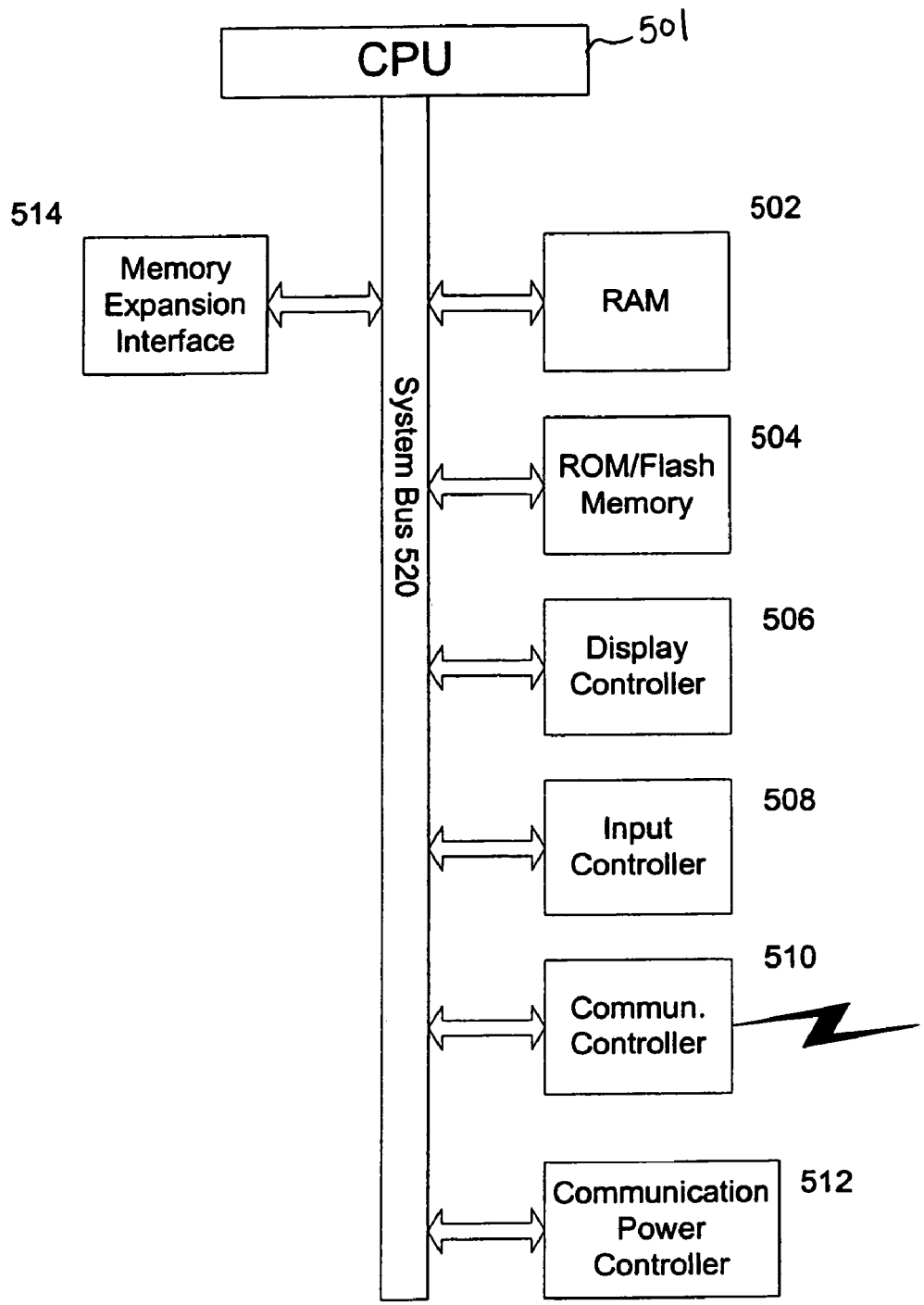
FIG. 5 shows a block diagram of the control device 400 in accordance with an embodiment of the invention.

FIG. 5 shows a block diagram of the control device 400 in accordance with an embodiment of the invention. The control device 400 includes CPU 501, RAM 502, ROM/Flash Memory 504, display controller 506, input controller 508, communications controller 510, communication power controller 512 and memory expansion interface 514. The various units of the control device 400 are interconnected by way of system bus 520. The CPU 501 processes instructions or sequences of instructions stored in the RAM 502 and/or ROM/Flash Memory 504 in response to input commands of a user via input controller 508. The display controller controls the display of images and text on the display in response to commands from the CPU 501.

Communications controller 510 allows the control device 400 to receive and process wireless digital data from the main server and other electronic devices on the wireless LAN. Communication Power Controller 512 allows control of the communications power as will be described below. The power controller 512 may also contain a power direction control circuit. Memory expansion interface 514 provides an expansion slot to add more memory to the controller. It is to be understood that the items in the block diagram of FIG. 5 are exemplary items intended to provide a functional description of the control device 400. The control device may incorporate any of the components of a known wireless computing device. In addition, the control device may include any of the features of a general computing device such as the device described in FIG. 14.

As discussed above, the control device 400 may be used to provide various management and control functions for the electronic devices on the wireless network, including the set up of new network devices on a wireless network, and registration of electronic devices in the control device 400. FIG. 6 shows an exemplary menu that may be displayed on the display 410 of the control device in accordance with an embodiment of the invention. As seen in this figure, the menu allows user selection of a "1. Setup New Device for Network and Register" function, a "2. Search Unregistered Device for Registration" command and a "3. Display Device Menu" command. These menu selections are exemplary only and other menu selections may be provided.

Figure 7:
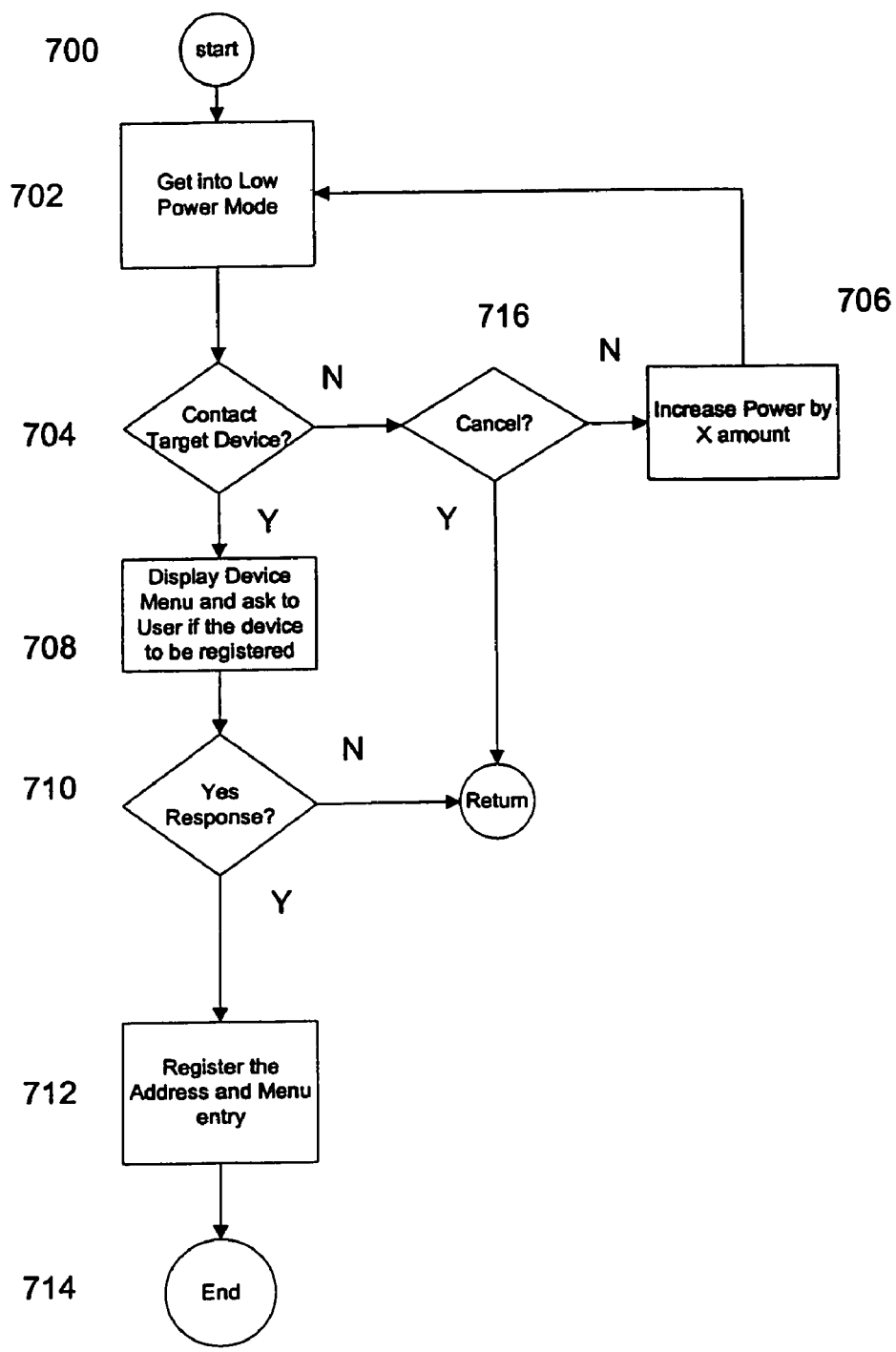
FIG. 7 is a flow chart indicating a process for setting up a new electronic device for the wireless network and registering the new electronic device in the control device 400 in accordance with the present invention.

FIG. 7 is a flow chart indicating a process for setting up a new electronic device for the wireless network and registering the new electronic device in the control device 400 in accordance with the present invention. The process begins at step 700 when the user of the control device 400 presses the menu button 430 on the input keypad 415, and selects the "1. Setup New Device for Network and Register" menu option. In step 702, the communication power controller 512 controls the communication controller 510 to output a predetermined low power transmission to establish contact with a target electronic device to be added to the network 150. Preferably, the user of the control device 400 brings the control device in close proximity to the target device in order to establish a limited access low power connection to the target device. Starting from a low power connection is preferably applied to the target device in order to avoid the target device joining a different network. Close proximity is preferably within one meter, but other distances may be used. In decision block 704, the control device 400 determines whether an electronic device has been contacted by control device 400. While step 704 of FIG. 7 indicates that it is determined whether the "target device" has been contacted, it is possible that a non-target device will be contacted as described below. If an electronic device has not been contacted, the communication power controller 512 controls the communication controller 510 to increase the output power by a predetermined increment in order to increase the likelihood of contact with the target device. Preferably, the target device is also increasing the power when the device has not been set up yet. Multiple attempts to contact an electronic device, and incremental power increases are performed until the control device 400 determines that contact has been made with an electronic device or the operation is canceled by the user at step 716. The target device also preferably goes through the same power control from the low power so that the control device 400 is the first device to access the target device.

Steps 702-706 establish a wireless setup connection between the control device 400 and an electronic device (preferably the target device) in order to obtain an address of the target device so that the target device may be added to the LAN 150 and/or registered in the control device 400. The setup contact with the electronic device can be established and maintained through various limited access direct connections such as infra red peer to peer, Bluetooth etc. In such a case, the configuration of the network can be set up using a method similar to that disclosed in U.S. patent application Ser. No. 10/085,044 (Publication No. 2002/0147819), the entire contents of which is incorporated herein by reference. Wi-Fi certified peer to peer can also be used. In the peer to peer contact, the address and other attributes of the network environment can be installed to the target device through the web service. An alternative to peer to peer protocol or using a separate communication channel such as infra red or Bluetooth is to allow the control device to automatically assign an IP address to the target device. In such a case, the control device 400 must be capable of dynamic host configuration protocol (DHCP) server functions. The DHCP setup process is defined by Internet Engineering Task Force (IETF) at the ietf.org internet page at request for comments no RFC 2131 for IPv4, and RFC 3315 for IPv6, the entire content of these documents are incorporated herein by reference.

Figure 8:
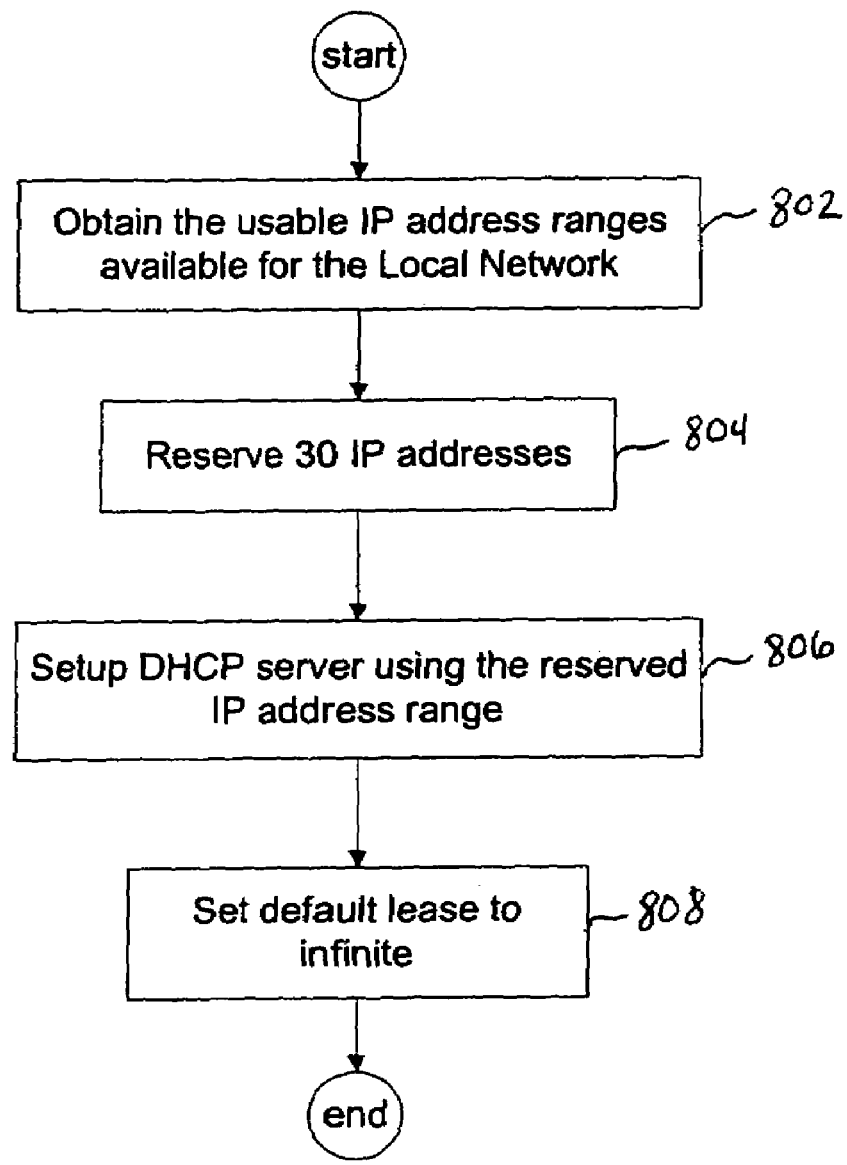
FIG. 8 is a flow chart depicting a process for setting up the control device as a DHCP server in accordance with an embodiment of the invention.

FIG. 8 is a flow chart depicting a process for setting up the control device as a DHCP server in accordance with an embodiment of the invention. In step 802, a range of available IP addresses for the wireless network is obtained by the control device. This range of IP addresses can be manually obtained or automatically obtained by examining the used network addresses and also the IP ranges used by the existing DHCP server as is known in the art. In step 804, a predetermined number of IP addresses are reserved by the handheld device for DHCP assignment. While the flow chart of FIG. 8 shows 30 IP addresses, the number of reserved addresses can be set by the user based on the network size or other factors. The control device 400 is then set up in step 806 to provide DHCP server functions with the default lease as infinite. This allows IP assignments to the target device to be permanent, rather than for a limited time as is conventional in the art.

Returning to FIG. 7, in step 708, the controller 400 obtains a device menu from the electronic device it has made contact with, and displays the device menu on the display 410 of the control device 400. In one embodiment, once the IP address is set, the control device 400 will access Port 80 of the contacted device in order to obtain the device menu. The device menu includes information about the contacted electronic device and may be a web page of the contacted electronic device. The information about the contacted electronic device is provided to the user of the control device so that the user may decide whether to add the device to the network and/or register the device for control by the control device 400. In some cases the contacted device may already be connected to the network, and only control registration must be decided.

In addition to providing device information to the user, the control device 400 prompts the user to decide whether the electronic device associated with the device menu displayed should be registered in the control device 400. Although the process of establishing contact with a device (preferably, the target device) is power controlled, non-target device may establish a setup connection with the control device 400. For example, a neighboring network device that is positioned a considerable distance from the control device 400 may have a highly sensitive receiver that picks up the signal from the control device 400. Thus, the device menu returned to the control device 400 may be that of a non-target device. One embodiment of the present invention provides a selection screen for the user to select whether to register or not register the contacted device.

Figure 9:
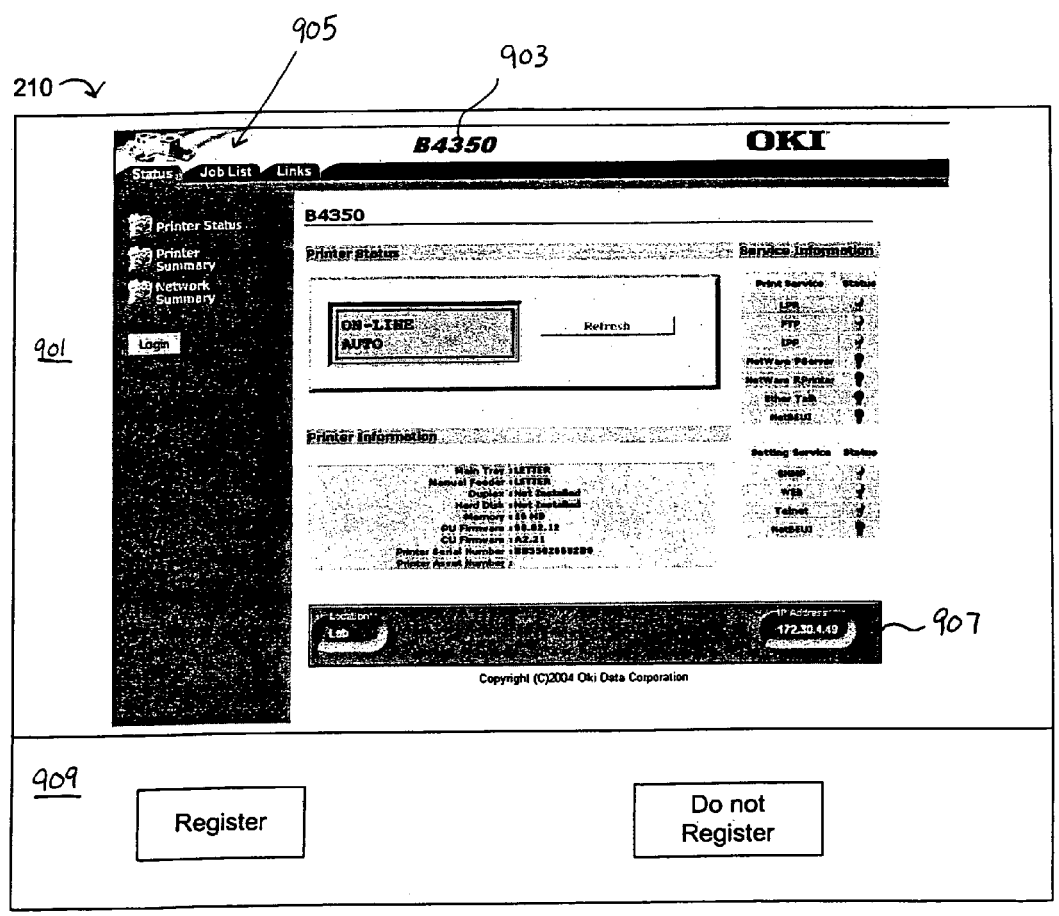
FIG. 9 shows an example of a selection screen displayed on the control device in accordance with an embodiment of the present invention.

FIG. 9 shows an example of a selection screen displayed on the control device in accordance with an embodiment of the present invention. As seen in this figure, the selection screen includes a device menu portion 901 and a registration selection portion 909. The device menu portion 901 includes a device identifier 903 for identifying the device contacted, and a device menu tab portion 905 that allows a user to select different types of information for the device displayed. The device menu also includes an IP identifier tab 907. As seen in FIG. 9, the device is identified as "B4350," which is a printer having IP address 172.30.4.49, and the "status" tab has been selected. The registration selection portion 907 includes a "register" button and a "do not register" button. The user of the control device can view the device information to determine if the device is actually the target device, or a non-target neighboring device. Based on this determination, the user can operate the input controls of the control panel 415 to select the appropriate button for registration or non-registration.

Although the user of control device 400 is prompted for registration selection by the selection menu, registration selection may be accomplished by an audio request from the control device 400, or any audio and/or visual means known in the art. Similarly, the user's selection can be a voice command or any known means of input to control device 400.

Figure 10:
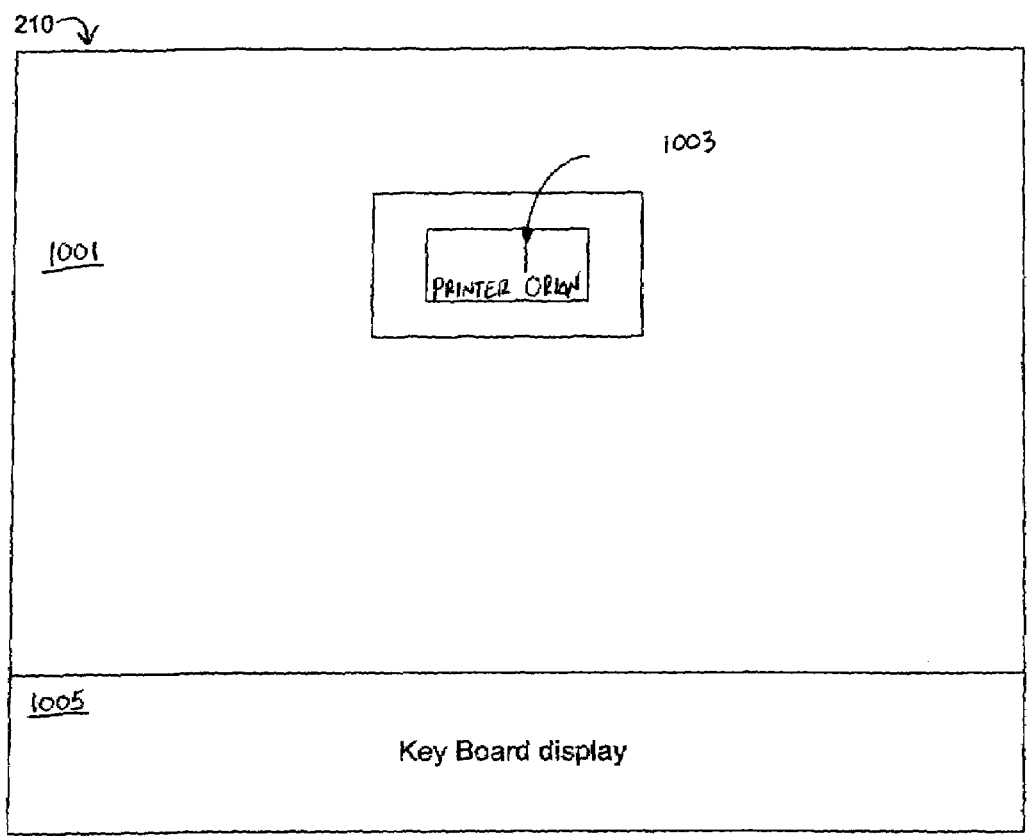
FIG. 10 shows an example of a menu entry creation screen in accordance with an embodiment of the present invention.

Returning to FIG. 7, in step 710, the control device 400 determines if the displayed device is to be registered or not based on the user's input. If the device is not to be registered, control device returns to step 700 to contact another electronic device. The device not to be registered may be a device that the user wishes to add to the wireless network, but not register for control in the control device 400. In the case, the control device 400 may store the IP address of the contacted device and the device not to be registered maintains its IP address (if assigned from the control device 400) for network operation. However, if the device not to be added is a neighboring device, any IP address assigned to this device by the controller, such as by DHCP, is expired so that the IP address may be used for network devices associated with the user and the controller. In this regard, it is to be understood that the assigned IP address may be maintained for a short period of time to allow the control device 400 to "ignore" the device not to be added while the target device is identified.

Where the user of the control device 400 chooses to register the device displayed, the process proceeds to step 712, where the IP address obtained from, or assigned to, the electronic device is stored in the control device 400. In a preferred embodiment, the IP address is stored in association with a menu entry of the control device 400. In addition, the control device 400 will change the IP address of the target device to be a permanent address instead of the temporary address. FIG. 10 shows an example of a menu entry creation screen in accordance with an embodiment of the present invention. As seen in this figure, the menu creation screen includes a menu creation portion 1001 and a key board display portion 1005. The menu creation portion 1001 includes cursor window 1003 for typing a menu name associated with the device to be registered. As seen in FIG. 10, the user has registered the printer displayed in FIG. 9 as "Printer Orion." The key board display 1005 includes an alphanumeric keypad for typing a menu name. In one embodiment, the user can use the control device input controls 415 to select a character for entry into the cursor window. However, where the control device 400 is implemented in an electronic device having a physical keypad, such as a cell phone, the key board display 1005 may be omitted.

While FIGS. 9 and 10 are described as being displayed in response to a user contacting a device to be added to the network and registered, these screens may be initiated to register a device that is already part of the wireless network 150. For example, the user of control device 400 may press the menu button 430 to view the menu of FIG. 6, and select the "2. Search Unregistered Device for Registration" selection. This will cause the control device to contact devices already on the wireless network and display information for each device in a menu such as that shown in FIG. 9. The user may sequentially display these screens and decide, for each networked device, whether to register the device for control as described above.

Once the menu name is fully input, the user can end the process by pressing the "main menu" button on the control device for example. The device is now registered and the user can select the device name from a control menu.

Figure 11:
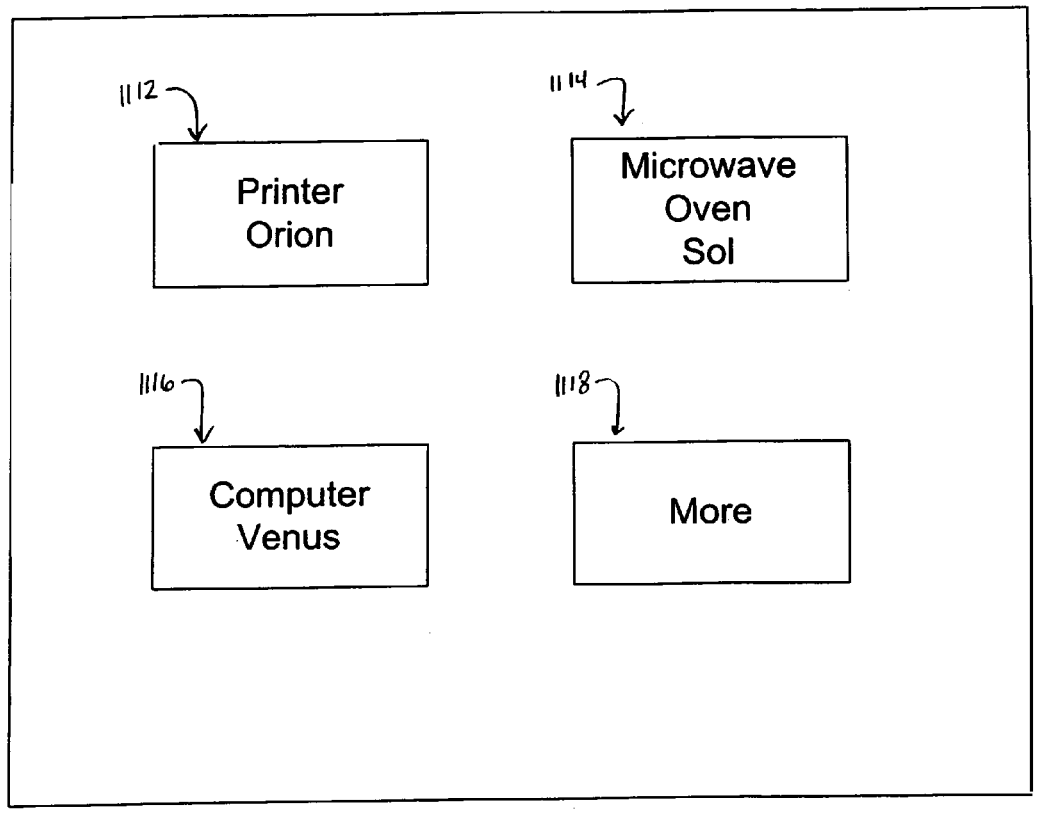
FIG. 11 is an illustration of the display 410 displaying a graphical display of selection boxes according to an embodiment of the present invention.
Figure 12:
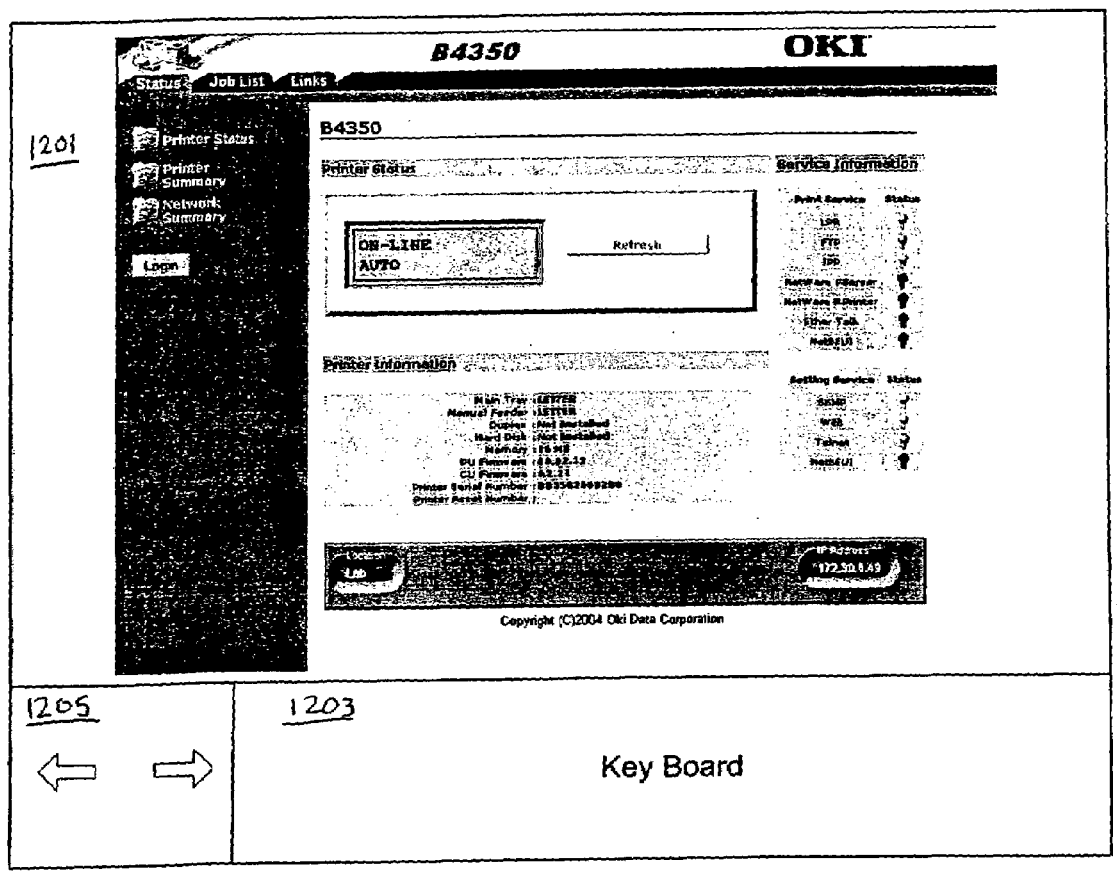
FIG. 12 shows an example of a control screen in accordance with an embodiment of the present invention.

FIG. 11 is an illustration of the display 410 displaying a graphical display of selection boxes according to an embodiment of the present invention. This menu may be accessed by the user selecting the "3. Display Device Menu" on the main menu, for example. As seen in FIG. 11, selection box 1112 is associated with printer Orion, selection box 1114 is associated with microwave oven Sol, and selection box 1116 is associated with computer Venus. Thus, the display of FIG. 11 displays the electronic devices that have been registered by the user of the control device 400. In this regard, the selection box 1118 is provided because there are registered devices that that cannot be displayed on the display 410. Where such a large number of devices have been registered, the control device 400 displays a first group of the responding devices on the display along with a "more" option as shown in FIG. 11.

Where a device is selected by the user, the control device displays a device control screen for the selected device, to allow user control of the selected device. For example, where the user selects the "Printer Orion," the device control screen of FIG. 12 is displayed by the control device 400. As seen in FIG. 12, the control screen includes a device menu portion 1201, which is similar to the selection screen 901 of FIG. 9. In addition, the device control screen includes a keyboard 1203 and arrow buttons 1205. The keyboard display 1203 allows alphanumeric entries as described with respect to FIG. 10, and the arrow buttons allow web browsing of the selected device menu similar to the HTML display page browsing common to web pages. The displays 1203 and 1205 allow the user to navigate through the device menu to control the device menu. These displays may be used alone or in combination with physical input mechanisms of the control device 400, or may be omitted when physical input mechanisms provide full control.

Figure 13:
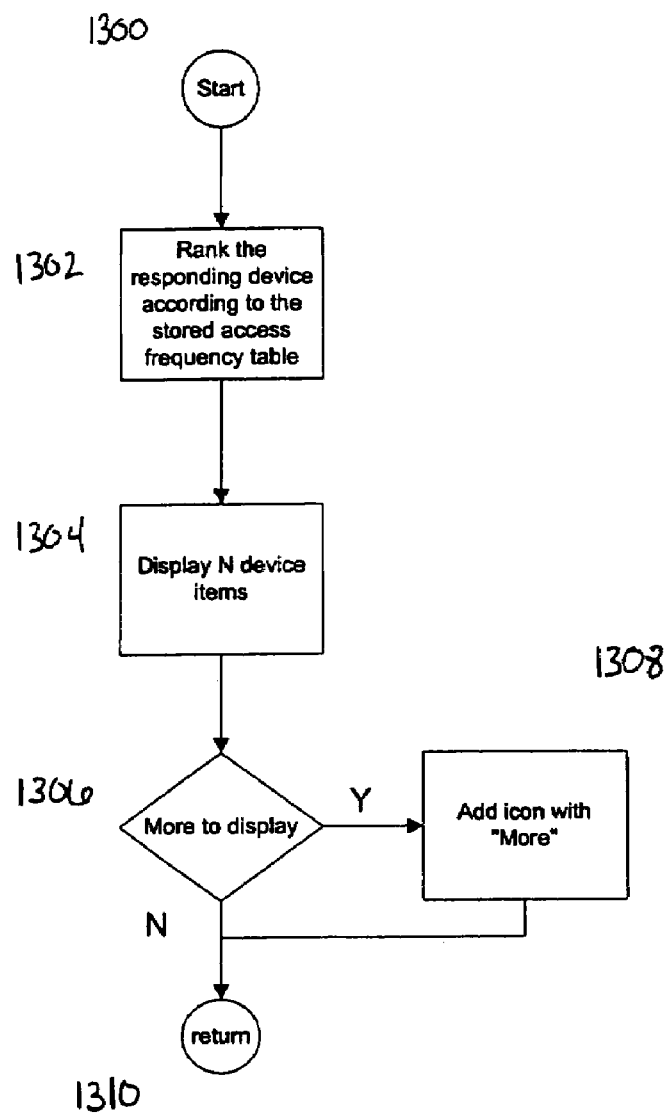
FIG. 13 is a flow chart illustrating a process for displaying the registered electronic devices on the control device in accordance with one embodiment of the present invention.

According to a preferred embodiment, the control device 400 provides the listing of registered electrical devices on the display 410 in a predetermined order. FIG. 13 is a flow chart illustrating a process for displaying the registered electronic devices on the control device in accordance with one embodiment of the present invention. In step 1302, the control device ranks the registered devices in accordance with a stored access frequency table. The access frequency table is a file that keeps track of user access to each of the registered electronic devices in the wireless local area network. With the registered devices ranked, the control device 400 displays N devices on the display 410 as shown by step 1304 where N represents the number of devices capable of being displayed on the display 410 at one time, N is determined by the display resolution and size. At step 1306, if there are more devices registered than N devices, the system adds "More" icon or word in the step 1308. At step 1310, it returns to the calling process.

FIG. 14 illustrates an alternative portable computer system 1801 upon which an embodiment according to the present invention may be implemented. As indicated above, the computer system 1801 may function as the control device 400, the main sever or any other computing device in accordance with the present invention. Computer system 1801 includes a bus 1803 or other communication mechanism for communicating information, and a processor 1805 coupled with bus 1803 for processing the information. The processor 1105 may be implemented as any type of processor including commercially available microprocessors from companies such as Intel, AMD, Motorola, Hitachi and NEC.

The computer system 1801 may also include special purpose logic devices (e.g., application specific integrated circuits (ASICs)) or configurable logic devices (e.g., generic array of logic (GAL) or reprogrammable field programmable gate arrays (FPGAs)). Other removable media devices (e.g., a compact disc, a tape, and a removable magneto-optical media) or fixed, high density media drives, may be added to the computer system 1801 using an appropriate device bus (e.g., a small computer system interface (SCSI) bus, an enhanced integrated device electronics (IDE) bus, or an ultra-direct memory access (DMA) bus). The computer system 1801 may additionally include a compact disc reader, a compact disc reader-writer unit, or a compact disc juke box, each of which may be connected to the same device bus or another device bus.

Computer system 1801 may be coupled via bus 1803 to a display 1813, such as a cathode ray tube (CRT), for displaying information to a computer user. The display 1813 may be controlled by a display or graphics card. The computer system includes input devices, such as a keyboard 1815 and a cursor control 1817, for communicating information and command selections to processor 1805. The cursor control 1817, for example, is a mouse, a trackball, or cursor direction keys for communicating direction information and command selections to processor 1805 and for controlling cursor movement on the display 1813.

The computer system 1801 performs a portion or all of the processing steps of the invention in response to processor 1805 executing one or more sequences of one or more instructions contained in a memory, such as the main memory 1807. Such instructions may be read into the main memory 1807 from another computer-readable medium, such as storage device 1811. One or more processors in a multi-processing arrangement may also be employed to execute the sequences of instructions contained in main memory 1807. In alternative embodiments, hard-wired circuitry may be used in place of or in combination with software instructions. Thus, embodiments are not limited to any specific combination of hardware circuitry and software.

As stated above, the system 1801 includes at least one computer readable medium or memory programmed according to the teachings of the invention and for containing data structures, tables, records, or other data described herein. Stored on any one or on a combination of computer readable media, the present invention includes software for controlling the computer system 1801, for driving a device or devices for implementing the invention, and for enabling the computer system 1801 to interact with a human user, e.g., a customer. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to, scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions to processor 1805 for execution. A computer readable medium may take many forms, including but not limited to, non-volatile media, volatile media, and transmission media. Non-volatile media includes, for example, optical, magnetic disks, and magneto-optical disks, such as storage device 1811. Volatile media includes dynamic memory, such as main memory 1807. Transmission media includes coaxial cables, copper wire and fiber optics, including the wires that comprise bus 1803. Transmission media also may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave (described below), or any other medium from which a computer can read.

Various forms of computer readable media may be involved in carrying out one or more sequences of one or more instructions to processor 1805 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to computer system 1801 may receive the data on the telephone line and use an infrared transmitter to convert the data to an infrared signal. An infrared detector coupled to bus 1803 can receive the data carried in the infrared signal and place the data on bus 1803. Bus 1803 carries the data to main memory 1807, from which processor 1805 retrieves and executes the instructions. The instructions received by main memory 1807 may optionally be stored on storage device 1811 either before or after execution by processor 1805.

Computer system 1801 also includes a communication interface 1819 coupled to bus 1803. Communication interface 1819 provides a two-way data communication coupling to a network link 1821 that is connected to a local network (e.g., LAN 1823). For example, communication interface 1819 may be a network interface card to attach to any packet switched local area network (LAN). As another example, communication interface 1819 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 1819 sends and receives electrical, electromagnetic or optical signals that carry digital data streams representing various types of information. The radio waves may be implemented using a spread spectrum technique such as Code Division Multiple Access (CDMA) communication or using a frequency hopping technique such as that disclosed in the Bluetooth specification previously described.

Network link 1821 typically provides data communication through one or more networks to other data devices. For example, network link 1821 may provide a connection through LAN 1823 to a host computer 1825 or to data equipment operated by a service provider, which provides data communication services through an IP (Internet Protocol) network 1827 (e.g., the Internet). LAN 1823 and IP network 1827 both use electrical, electromagnetic or optical signals that carry digital data streams. The signals through the various networks and the signals on network link 1821 and through communication interface 1819, which carry the digital data to and from computer system 1801, are exemplary forms of carrier waves transporting the information. Computer system 1801 can transmit notifications and receive data, including program code, through the network(s), network link 1821 and communication interface 1819.

Obviously, numerous additional modifications and variations of the present invention are possible in light of the above teachings. It is therefore to be understood that within the scope of the appended claims the present invention may be practiced otherwise than as specifically described herein.

What is claimed is:

1. A method for use in a first wireless device for controlling a second wireless device, the method comprising:
   setting an address of the second wireless device by way of a wireless medium by sending a wireless signal from the first wireless device at a predetermined power less than a full communication range of the first wireless device, and if a response is not received by the first wireless device, resending the signal at a second power level higher that the first power level;
   obtaining identification information of the second wireless device from the second wireless device;
   determining whether to register or not to register the second wireless device for control by the first wireless device based on the identification information; and
   saving the address of the second wireless device into a memory of the first wireless device when the first wireless device determines to register the second wireless device for control by the first wireless device.

2. The method of claim 1, wherein said setting an address comprises setting a hard wired address from the second wireless device.

3. The method of claim 1, wherein said setting an address comprises obtaining a software address from the second wireless device.

4. The method of claim 3, wherein said setting an address comprises the first wireless device assigning an IP address to said second wireless device.

5. The method of claim 4, further comprising;
   providing DCHP server capability to said first wireless device;
   setting the lease for the DCHP server to infinite.

6. The method of claim 1, wherein said obtaining identification information comprises obtaining a home page of the second wireless device.

7. The method of claim 1, wherein said determining comprises:
   presenting said information about the second wireless device to the user of the first wireless device;
   requesting the user to decide whether to register the second device or not to register the second device; and
   determining whether to register or not to register the second wireless device for control by the first wireless device based on a user input to the control device.

8. The method of claim 7, wherein:
   said presenting comprises displaying a register decision screen on a display of the first wireless device, said requesting comprises displaying a register and a do not register button on the display of the first wireless device, and said determining comprises receiving an input to the register or do not register buttons.

9. The method of claim 1, further comprising prompting the user to create a menu item for the second device, wherein said saving comprises saving the address of the second wireless device in association with the menu item.

10. The method of claim 9, further comprising displaying a device control menu of registered devices including said second wireless device on a display of the first wireless device.

11. The method of claim 10, further comprising displaying said registered devices in an order corresponding to the frequency that they are controlled by the user.

12. A computer readable medium containing program instructions for execution on a wireless device, which when executed by the wireless device, cause the wireless device to perform the steps of the method recited in claim 1.

13. A wireless control device comprising:
  a memory device having embodied therein, data related to controlling a target wireless device; and
  a processor in communication with said memory device, said processor configured to:
  set an address of the target wireless device by sending a wireless signal from the wireless control device at a predetermined power less than a full communication range of the wireless control device, and if a response is not received by the wireless control device, resending the signal at a second power level higher that the first power level;
  obtain identification information of the target wireless device from the target wireless device;
  determine whether to register or not to register the target wireless device for control by the wireless control device based on the identification information; and
  save the address of the target wireless device into said memory when the wireless control device determines to register the wireless target device for control by the wireless control device.

14. The device of claim 13 wherein said processor is configured to obtain a hard wired address from the target wireless device.

15. The device of claim 13, wherein said processor is configured to obtain a software address from the target wireless device.

16. The device of claim 15, wherein said processor is configured to assign an IP address to said target wireless device.

17. The device of claim 16, wherein said processor is configured to provide DCHP server capability to said target wireless device, wherein the lease for the DCHP server is set to infinite.

18. The device of claim 13, wherein said processor obtains said identification information by obtaining a home page of the target wireless device.

19. The device of claim 13, wherein said processor determines whether to register or not to register the target wireless device for control by:
  presenting said information about the target wireless device to the user of the wireless control device;
  requesting the user to decide whether to register the target device or not to register the target device; and
  determining whether to register or not to register the target wireless device for control by the first wireless device based on a user input to the wireless control device.

20. The device of claim 19, further comprising a display, wherein said processor is configured to:
  display a register decision screen on the display,
  display a register and a do not register button on the display of the first wireless device, and
  receive an input to the register or do not register buttons.

21. The device of claim 13, wherein the processor is configured to prompt the user to create a menu item for the second device and save the address of the target wireless device in association with the menu item.

22. The device of claim 21, wherein said processor is configured to display a device control menu of registered devices including said target wireless device on the display.

23. The device of claim 22, wherein said processor is configured to display said registered devices in an order corresponding to the frequency that they are controlled by the user.

24. A wireless control device comprising:
  means for storing data related to controlling a target wireless device; and
  means for obtaining an address of the target wireless device by sending a wireless signal from a first wireless device to the target wireless device at a power less than a full communication range of the first wireless device, and if a response is not received by the first wireless device, resending the signal at a second power level higher that the first power level;
  means for obtaining identification information of the target wireless device from the target wireless device;
  means for determining whether to register or not to register the target wireless device for control by the wireless control device based on the identification information; and
  means for saving the address of the target wireless device into said memory when the wireless control device determines to register the wireless target device for control by the wireless control device.

\* \* \* \* \*